(12) United States Patent
Kiener et al.

(10) Patent No.: US 7,598,201 B2
(45) Date of Patent: Oct. 6, 2009

(54) PROCESS FOR PREPARING A SUPPORT FOR OLEFIN POLYMERIZATION CATALYSTS

(75) Inventors: Christoph Kiener, Weisenheim (DE); Ingo Treffkorn, Dudenhofen (DE); Guido Funk, Worms (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 12/086,319

(22) PCT Filed: Dec. 4, 2006

(86) PCT No.: PCT/EP2006/011597

§ 371 (c)(1),
(2), (4) Date: Jun. 10, 2008

(87) PCT Pub. No.: WO2007/068365

PCT Pub. Date: Jun. 21, 2007

(65) Prior Publication Data

US 2009/0048099 A1  Feb. 19, 2009

Related U.S. Application Data

(60) Provisional application No. 60/762,978, filed on Jan. 27, 2006.

(30) Foreign Application Priority Data

Dec. 16, 2005 (DE) ........................ 10 2005 060 770

(51) Int. Cl.
*B01J 21/00* (2006.01)
*C08F 4/72* (2006.01)
*C08F 4/44* (2006.01)
*C08F 4/06* (2006.01)

(52) U.S. Cl. ........................ 502/239; 502/232; 502/233; 502/234; 502/236; 526/106; 526/129; 526/130

(58) Field of Classification Search ................ 502/239, 502/233, 236, 242, 256, 232, 234, 237, 240; 526/6, 129, 130, 348

See application file for complete search history.

(56) References Cited

U.S. PATENT DOCUMENTS

| 4,042,769 A | | 8/1977 | Lynch |
| 4,048,414 A | | 9/1977 | Frielingsdorf et al. |
| 4,053,436 A | * | 10/1977 | Hogan et al. ................ 502/236 |
| 5,372,983 A | | 12/1994 | Mullen et al. |
| 5,426,082 A | * | 6/1995 | Marsden ..................... 502/235 |
| 2003/0065112 A1 | | 4/2003 | Glemza et al. |

FOREIGN PATENT DOCUMENTS

| DE | 2509286 A1 | | 3/1975 |
| DE | 2540279 A1 | | 9/1975 |
| EP | 1132130 B1 | | 7/1989 |
| GB | 1066181 | | 9/1963 |
| GB | 1066181 A | * | 9/1963 |
| WO | WO 93/23438 | | 11/1993 |
| WO | WO 2005/123793 A1 | | 12/2005 |

OTHER PUBLICATIONS

Mc Daniel, "Supported Chromium Catalysts for Ethylene Polymerization", *Advances in Catalysis*, vol. 33, pp. 48-98.
Mc Daniel, "Supported Chromium Catalysts for Ethylene Polymerization", *Advances in Catalysis*, vol. 33, pp. 48-98, (1985).
Brunauer, et al., "Adsorption of Gases in Multimolecular Layers", *Journal of American Chemical Society*, 60, pp. 309-319, (1938).

* cited by examiner

*Primary Examiner*—Jerry Lorengo
*Assistant Examiner*—Eli Mekhlin
(74) *Attorney, Agent, or Firm*—Jonathan L. Schuchardt

(57) ABSTRACT

The invention relates to a process for preparing an essentially spherical support for olefin polymerization catalysts, which comprises the steps: preparation of a hydrogel comprising a cogel of silicon oxide and at least one further metal oxide, if appropriate, washing of the hydrogel until the content of alkali metal ions is less than 0.1% by weight, based on the weight of solids, extraction of the water from the hydrogel until the water content is less than 5% by weight, based on the total content of liquid, and drying of the hydrogel to form a xerogel. According to the invention, the extraction step comprises at least one first extraction with a first organic solvent which is at least partially miscible with water down to a water content of 50% by weight, followed by at least one second extraction with a second organic solvent which is at least partially miscible with water.

8 Claims, No Drawings

PROCESS FOR PREPARING A SUPPORT FOR OLEFIN POLYMERIZATION CATALYSTS

CROSS-REFERENCE TO RELATED APPLICATIONS:

This application is a national phase filing under 35 U.S.C. § 371 of International Application PCT/EP2006/011597, filed 04 Dec. 2006, claiming priority to German Patent Application 102005060770.5 filed 16 Dec. 2005 and provisional U.S. Appl. No. 60/762,978 filed 27 Jan. 2006, the disclosures of International Application PCT/EP2006/011597, German Pat. Appl. 102005060770.5, and U.S. Appl. No. 60/762,978, each as filed, are incorporated herein by reference.

The invention relates to a process for preparing an essentially spherical support for olefin polymerization catalysts, which comprises the steps
a) preparation of a hydrogel comprising a cogel of silicon oxide and at least one further metal oxide,
b) if appropriate, washing of the hydrogel until the content of alkali metal ions is less than 0.1% by weight, based on the weight of solids,
c) extraction of the water from the hydrogel until the water content is less than 5% by weight, based on the total content of liquid,
d) drying of the hydrogel to form a xerogel.

Silica gels are the starting material for the preparation of Phillips catalysts for the polymerization of olefins. Important polymer parameters such as the melt flow rate ($MFR_{21}$) or the intrinsic viscosity and also important process parameters such as formation of fine dust or the bulk density of the polymer depend critically on the support material used.

Supports based on silica gel are usually prepared by firstly preparing a hydrogel in a gel formation process, subjecting this to an appropriate aging process, washing it with water and subsequently extracting the water by means of solvents having a lower surface tension or adding detergents to the water, before final milling, sieving and impregnation takes place.

Since the gel comprises a rigidly crosslinked, three-dimensional network of particles or short particle chains, it is clear that the network will collapse when the gel is dried. This is attributable to the high surface tension of the water present in the pores. It is therefore usual to replace the water by other solvents before drying or add detergents to the water in order to obtain a product having a high pore volume. Since a large pore volume is of critical importance for the quality of the supported catalyst, the extraction step is also of considerable importance.

For example, it is known from EP 1 132 130 B1 that the cogel can be extracted by means of a silicon compound in the preparation of a support. The use of hexane as extractant is known from US 2003/0065112 A1.

US 2003/0065112 A1 and U.S. Pat. No. 5,372,983 disclose the use of hexanol as extractant to remove the water from the particles by azeotropic distillation at 170° C. A disadvantage of this is the large quantity of energy required for the distillation.

In WO 93/23438 A1, it is stated that the extraction of the gel is carried out by slurrying of 100 parts of hydrogel with 100 parts of solvent, preferably isopropanol, with the procedure being carried out at least three times, preferably five times, but in any case as often as necessary for the water content to be less than 25%.

DE 25 40 279 A1 likewise discloses the use of organic solvents for the continuous extraction of the water. Solvents disclosed include tert-butanol, isobutanol, ethanol and methanol. Ethanol is used in the sole example.

The effectiveness of the lower alcohols increases with increasing molar mass, which leads to better products or shorter extraction times. On the other hand, the procurement and pretreatment costs likewise increase with increasing molar mass. The choice of the solvent used is therefore always a compromise.

Finally, DE 25 09 286 discloses the use of two different solvents in succession. Here, the water is firstly extracted completely by means of $C_1$-$C_4$-alkanols or $C_3$-$C_5$-alkanones and the alkanol or alkanone is subsequently extracted by means of a low-boiling hydrocarbon or oxahydrocarbon in order to reduce the molecular weight of the ethylene polymers prepared using the catalyst.

A disadvantage of the processes mentioned is that the water extraction times are quite long. In the extraction of cogels in particular, the extraction time increases significantly with increasing foreign metal content for a constant pore volume.

It is therefore an object of the present invention to provide a process for preparing supports for olefin polymerization catalysts, by means of which the extraction times for a constant quality of the supports can be shortened or the quality of the products can be improved for the same extraction times. A further object of the present invention is to minimize the consumption and costs of solvents. Another object of the present invention is to minimize the energy consumption during the extraction.

It has now been found that this object can be achieved by step c) comprising
(1) at least one first extraction with a first organic solvent which is at least partially miscible with water down to a water content of 50% by weight, followed by
(2) at least one second extraction with a second organic solvent which is at least partially miscible with water, with the second organic solvent having at least one carbon atom more or at least one branch, including the heteroatoms, more than the first organic solvent.

The process of the invention allows the extraction time to be shortened significantly. Furthermore, the quality of the supports in terms of the pore volume can be improved. It is particularly surprising that the efficiency of the process and also the quality of the products can be improved simultaneously by means of the solvent combination used according to the invention.

According to the invention, use is made of solvents which are at least partially miscible with water. Suitable solvents are generally all polar organic protic or aprotic polar solvents as long as they are at least partially miscible with water. In the case of liquids which are not completely miscible with water, the miscibility of the solvent should be above 1 g, preferably above 2 g, particularly preferably above 5 g, per 100 ml of water in order to achieve satisfactory extraction. The first and second organic solvents should likewise be at least partially, preferably completely, miscible with one another.

Preference is given to at least the first organic solvent being completely miscible with water. Particular preference is given to both organic solvents being completely miscible with water. Mixtures of various solvents can also be used, but the use of only one pure organic solvent is preferred. The solvent is preferably a saturated organic liquid comprising heteroatoms of groups 15, 16 and/or 17.

The solvents can be protic or aprotic organic solvents. Preference is given to organic protic solvents.

Protic solvents are, for example, alcohols $R^1$—OH, amines $NR^1_{2-x}H_{x+1}$, $C_1$-$C_5$-carboxylic acids or mixtures thereof, preferably alcohols $R^1$—OH, where $R^1$ is $C_1$-$C_{20}$-alkyl, $C_2$-$C_{20}$-alkenyl, $C_6$-$C_{20}$-aryl, alkylaryl having from 1 to 10 carbon atoms in the alkyl radical and 6-20 carbon atoms in the aryl radical, or $SiR^2_3$, where the radicals $R^2$ are each, independently of one another, $C_1$-$C_{20}$-alkyl, $C_2$-$C_{20}$-alkenyl, $C_6$-$C_{20}$-aryl, alkylaryl having from 1 to 10 carbon atoms in the alkyl radical and 6-20 carbon atoms in the aryl radical and x is 0, 1 or 2. Aprotic solvents are, for example, ketones, ethers, esters and nitriles, without being restricted thereto.

As radicals $R^1$ or $R^2$, preference is given to using $C_1$-$C_8$-alkyl which may be unbranched or branched, e.g. methyl, ethyl, n-propyl, isopropyl, n-butyl, isobutyl, tert-butyl, n-pentyl, n-hexyl, n-heptyl, n-octyl, 5- to 7-membered cycloalkyl which may in turn be alkyl-substituted, e.g. cyclopropane, cyclobutane, cyclopentane, cyclohexane, cycloheptane, cyclooctane. The organic radicals $R^1$ and $R^2$ may also be substituted by halogens such as fluorine, chlorine or bromine. Preferred alcohols $R^1$—OH are methanol, ethanol, 1-propanol, 2-propanol, 1-butanol, 2-butanol, 1-pentanol, 2-pentanol, 1-hexanol, 2-ethylhexanol, 2,2-dimethylethanol and 2,2-dimethylpropanol, in particular methanol, ethanol, 1-propanol, 1-butanol, 1-pentanol, 1-hexanol and 2-ethylhexanol.

The first organic solvent and the second organic solvent are particularly preferably selected independently from among $R^1OH$, $R^2$—CO—$R^3$, $R^2$—O—$R^3$, where $R^1$ is $C_1$-$C_6$-alkyl and $R^2$, $R^3$ are each, independently of one another, $C_1$-$C_4$-alkyl, with $R_1$ and $R_2$ each being able to be branched or unbranched and $R^1OH$ being most preferred both for the first organic solvent and the second organic solvent.

In a preferred embodiment, the boiling point of the organic solvents is less than or equal to 150° C., preferably less than or equal to 100° C., particularly preferably less than or equal to 80° C., so that they can be easily recovered by distillation. The recovery can also be made easier by the solvent not forming an azeotrope with water.

According to the invention, at least two different solvents are used in two successive extraction steps.

According to the invention, the second organic solvent has either at least one carbon atom or at least one branch more than the first organic solvent. In counting the branches, the branches formed by heteroatoms are also taken into account. As an illustrative example, 2-propanol has by definition one branch more than 1-propanol, since the hydroxyl group represents a branch. Hydrogen atoms are not counted.

As a result of the combination of solvents, supports having large pore volumes are obtained despite short extraction times or the pore volume can be significantly increased at the same extraction time. Large pore volumes in turn lead to catalysts having a particularly good performance. Since relatively short-chain and less branched solvents are usually cheaper, the main part of the water can be removed particularly inexpensively.

It has been found that groups having a greater bulk lead to supports having higher pore volumes for the same residual water content. Without wishing to be tied to this theory, the more hydrophilic first organic solvent removes the main part of the water particularly quickly and effectively, while the second organic solvent ensures a large pore volume.

Preference is given to the organic radicals $R^1$, $R^2$, $R^3$ of the second organic solvent together having at least one, in particular at least two, particularly preferably from two to three, more carbon atoms than the first organic solvent.

The second organic solvent preferably has a boiling point which is at least 10° C., in particular at least 15° C., higher than that of the first organic solvent. In this way, the first organic solvent which is easier to recover by distillation can be used for removing the main part of the water, while the higher-boiling second organic solvent ensures a larger pore volume.

The second organic solvent particularly preferably has the same functional group(s) as the first organic solvent, i.e. the first and second organic solvents belong to a homologous series.

Particularly good results in terms of recoverability, time savings and costs are achieved when the first organic solvent is selected from among methanol, ethanol, isopropanol and n-propanol and the second organic solvent is selected from among isopropanol, n-propanol, n-butanol, isobutanol and t-butanol. Ideally, methanol is used in combination with isopropanol, since methanol is cheap and can readily be worked up by distillation, while isopropanol provides a large pore volume and, owing to the fact that its boiling point is not too high, can easily be removed from the support.

The extractions with the first organic solvent take place, according to the invention, down to a water content of less than 50% by weight, preferably less than 20% by weight, more preferably less than 10% by weight, particularly preferably less than 5% by weight. The extractions with the first organic solvent preferably take place down to a water content of more than 0.1% by weight, more preferably more than 0.5% by weight, more preferably more than 1% by weight, particularly preferably more than 2% by weight. In a particularly advantageous embodiment, the extractions with the first organic solvent are carried out to a water content of from 10 to 0.5% by weight.

The extraction with the first organic solvent as per step (1) can be carried out batchwise or continuously, with batchwise extraction being preferred.

The batchwise extraction is preferably carried out as follows. The isolated particles are placed in an extraction vessel which is provided with an inlet at the top, a horizontal screen and an outlet connected to the underside of the extraction vessel. The liquid level in the extraction vessel is selected so that the hydrogel particles are completely covered with liquid. The charging process usually takes from 5 to 15 minutes. The system is then preferably allowed to stand for from 5 to 20 minutes. Particular preference is here given to starting with short times and increasing these on each repetition so that the duration of the batchwise extractions increases with decreasing water content. The organic solvent concerned is then pumped out. This process likewise usually takes from 5 to 15 minutes.

The extractions with the first organic solvent are followed by the extractions with the second organic solvent. This is, according to the invention, carried out until a water content of less than 5% by weight has been reached. The continuous extraction is preferably carried out until a water content of less than 3% by weight, more preferably less than 2% by weight, more preferably less than 1% by weight, particular preferably less than 0.5% by weight, has been reached.

The extractions with the second organic solvent as per step (2) can likewise be carried out batchwise or continuously, with continuous extraction being preferred.

The continuous extraction is preferably carried out as described in DE 25 40 279 A1. Here, the isolated particles are placed in an extraction vessel provided with an inlet at the top, a horizontal screen and a swan-neck-shaped overflow which is connected to the underside of the extraction vessel, and the liquid level in the extraction vessel is kept high enough for the hydrogel particles to be completely covered with liquid. The organic solvent concerned is then allowed to run in until the outflowing mixture of water and organic solvent has attained the desired water content. The inflow rate of the organic solvent is preferably from 0.2 to 10 l/h per kilogram of hydrogel, particularly preferably from 0.5 to 5 l/kg/h.

Both the extraction with the first organic solvent and the extractions with the second organic solvent can comprise one or more extraction steps which can each be carried out continuously or batchwise. Preference is given to more than 2, more preferably more than 3, particularly preferably more than 5, batchwise extractions being carried out in step (1). The number of continuous extractions has no upper limit, but more than 10 extractions give little advantage. In step (2), preference is given to carrying out not more than 2 continuous extractions, particularly preferably a single continuous extraction. In a particularly preferred embodiment, from 2 to 5 batchwise extractions with the first organic solvent are carried out in step (1) and one continuous extraction with the second organic solvent is carried out in step (2).

The extractions with the first organic solvent preferably each have a duration of from 30 seconds to 1 hour, more preferably from 1 minute to 40 minutes, more preferably from 2 minutes to 30 minutes, particularly preferably from 3 minutes to 20 minutes. The total duration of the extractions with the first organic solvent should not exceed 5 hours, preferably 3 hours. The extractions with the second organic solvent preferably each have a duration of from 5 minutes to 5 hours, more preferably from 10 minutes to 4 hours, more preferably from 15 minutes to 3 hours, particularly preferably from 20 minutes to 2 hours, but in any case until the desired final water content has been reached. The total duration of the extractions with the second organic solvent should not exceed 5 hours, preferably 3 hours.

The water content is based, in the case of a batchwise extraction, on the proportion of water in the extraction mixture immediately after separation from the hydrogel relative to the total extraction mixture. The water content in the case of a continuous extraction is based on the proportion of water in the eluate coming from the hydrogel to be extracted relative to the total eluate.

The determination of the water content in the extraction solvent can be carried out by all known methods. It is preferably carried out by Karl-Fischer titration. The Karl-Fischer method is based on the oxidation of sulfur dioxide by iodine according to the following chemical reaction:

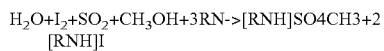

The titration can be followed volumetrically or calorimetrically. The advantage of the Karl-Fischer method is that both relatively large amounts and traces of water can be determined very precisely.

The density of the solvent mixture can also be employed for determining the water content.

In step a) of the process of the invention, a hydrogel is firstly prepared. The hydrogel comprises a cogel of silicon oxide and at least one further metal oxide. Preference is given to a cogel consisting of silicon oxide and at least one further metal oxide.

For the purposes of the present invention, the term "hydrogel" encompasses all hydrogels which are suitable for preparing supports and are based on silicon-comprising starting materials; the term "hydrogel" preferably refers to hydrogels based on silica. According to the invention, the hydrogels comprise a cogel with at least one further metal oxide. The proportion of the cogel is preferably more than 20% by weight, more preferably more than 50% by weight. Particular preference is given to the hydrogel consisting of a cogel.

The water content of the hydrogel is preferably at least 80% by weight, preferably at least 90% by weight, based on the total weight of the hydrogel.

The preparation of a silica hydrogel or cogel is preferably carried out by acidic or basic precipitation from water glass. The preparation of the hydrogel is preferably carried out by introducing a sodium or potassium water glass solution into a rotating stream of a mineral acid, e.g. sulfuric acid. The silica hydrosol formed is subsequently sprayed into a gaseous medium by means of a nozzle. The nozzle mouthpiece used here leads, after solidification of the hydrosol in the gaseous medium, to hydrogel particles having a mean particle size which can be varied in a range from, for example, 1 mm to 20 mm by choice of the nozzle. The hydrogel particles preferably have a mean particle size in the range from 2 mm to 10 mm, preferably in the range from 5 mm to 6 mm.

The hydrogel particles can be sieved and fractions having the preferred diameter can be isolated.

Apart from spraying of a hydrosol, other methods known from the prior art can likewise be used for preparing the hydrogel. For example, hydrogels, preferably silica hydrogels, which can be prepared in a manner known from the prior art, for example from silicon-comprising starting materials such as alkali metal silicates, alkyl silicates and/or alkoxysilanes, can likewise be used for preparing supports according to the invention.

The size of hydrogel particles which can be used can vary within a wide range, for example in a range from a few microns to a few centimeters. The size of hydrogel particles which can be used is preferably in the range from 1 mm to 20 mm, but hydrogel cakes can likewise be used. It can be advantageous to use hydrogel particles having a size of ≦6 mm. These are obtained, for example, as by-product in the production of granular supports.

The hydrogels which can be prepared in step a) are preferably largely spherical. Hydrogels which can be prepared in step a) also preferably have a smooth surface. Silica hydrogels which can be prepared in step a) preferably have a solids content in the range from 10% by weight to 25% by weight, more preferably in the region of 17% by weight, calculated as $SiO_2$.

Step a) can optionally be followed by milling of the hydrogel to a finely particulate hydrogel. Here, preference is given to at least 5% by volume of the particles, based on the total volume of the particles, having a particle size in the range from >0 μm to ≦3 μm; and/or at least 40% by volume of the particles, based on the total volume of the particles, having a particle size in the range from >0 μm to ≦12 μm, and/or at least 75% by volume of the particles, based on the total volume of the particles, having a particle size in the range from >0 μm to ≦35 μm. Preference is here given to producing a finely particulate hydrogel having a solids content in the range from >0% by weight to ≦25% by weight, preferably in the range from 5% by weight to 15% by weight, more preferably in the range from 8% by weight to 13% by weight, particularly preferably in the range from 9% by weight to 12% by weight, very particularly preferably in the range from 10% by weight to 11% by weight, calculated as oxide. Particular preference is given to producing a finely particulate silica hydrogel having a solids content in the range from >0% by weight to ≦25% by weight, preferably in the range from 5% by weight to 15% by weight, more preferably in the range from 8% by weight to 13% by weight, particularly preferably in the range from 9% by weight to 12% by weight, very particularly preferably in the range from 10% by weight to 11% by weight, calculated as $SiO_2$, in step b). The solids content is preferably adjusted by dilution, for example by addition of deionized water.

The milling of the hydrogel can be carried out in a suitable mill, for example a pin mill or an impingement plate mill; the hydrogel is preferably milled wet in a stirred ball mill. The milling of the hydrogel can be carried out in one step and/or in one mill or in a plurality of steps and/or various mills. Before the hydrogel is finely milled, the hydrogel can be subjected to preliminary comminution or preliminary milling.

According to the invention, the gel is a cogel with a further metal oxide. Suitable metal oxides are the oxides of the elements Mg, Ca, Sr, Ba, B, Al, P, Bi, Sc, Ti, V, Mn, Fe, Co, Ni, Cu, Zn, Zr, Nb, Mo, Ru, Rh, Pd, Hf, Ta and W and also, if appropriate, one or more activators. Preference is given to using an element selected from among Mg, Ca, B, Al, P, Ti, V, Zr and Zn. Further preference is given to the use of Ti, Zr or Zn. Particular preference is given to the use of Ti. The content of the elements mentioned in the hydrogel is preferably from 0.1 to 20% by weight, more preferably from 0.3 to 10% by weight, particularly preferably from 0.5 to 5% by weight.

In step b) of the process of the invention, the hydrogel is, if necessary, washed with water until the content of alkali metal ions is less than 0.1% by weight, based on the weight of solids. The residue content of alkali metal ions is preferably less than 0.05% by weight, particularly preferably less than 0.01% by weight. The washing of the hydrogel is carried out by generally known methods. Washing is preferably carried out with weakly ammoniacal water having a temperature of from about 50° C. to 80° C. in a continuous countercurrent process. The residue sodium content can be determined, for example, by atomic absorption spectroscopy.

In a preferred embodiment, the hydrogel particles can optionally be subjected to an aging step in the range from 1 hour to 100 hours, preferably in the range from 5 hours to 30 hours, before washing and/or after washing with the alkaline solution to enable pore volume, surface area and/or mean pore radius of the support to be set.

After extraction of the water from the hydrogel down to a water content of less than 5% by weight, based on the total content of liquid, in step c), the hydrogel is finally dried in step d) to form a xerogel. For the purposes of the invention, drying is the removal of the solvent from the gel.

Drying of the finely particulate hydrogel can be carried out by all customary methods such as thermal drying, drying under reduced pressure or spray drying, with a combination of various methods also being possible. For example, the spray-dried support particles can additionally be thermally dried.

The support particles in the form of xerogels generally have a spheroidal, i.e. ball-like, shape. The desired mean particle size of the supports after drying can be varied within a wide range and can be matched to the use of the supports. The mean particle size of the supports can thus, for example, be set according to various processes of the polymerization.

The support particles preferably have a mean particle size in the range from 1 µm to 350 µm, preferably in the range from 30 µm to 150 µm and particularly preferably in the range from 40 µm to 100 µm. The support particles which can preferably be produced by means of spray drying particularly preferably have a mean particle size in the range from 30 µm to 90 µm, more preferably in the range from 40 µm to 70 µm, even more preferably in the range from 40 µm to 50 µm and very particularly preferably in the range from 40 µm to 55 µm.

Particular preference is given to from 70% by volume to 90% by volume of the support particles, preferably 80% by volume of the particles, based on the total volume of the particles, having a mean particle size in the range from $\geq 40$ µm to $\leq 90$ µm.

Support particles which are preferably used for polymerization in slurry polymerization processes preferably have mean particle sizes of up to 350 µm, preferably a mean particle size in the range from 30 µm to 150 µm. Support particles which are preferably used for polymerization in gas-phase fluidized-bed processes preferably have a mean particle size in the range from 30 µm to 120 µm. Support particles which are preferably used for polymerization in suspension processes preferably have a mean particle size in the range from 30 µm to 300 µm, and support particles which are preferably used for polymerization in loop processes preferably have a mean particle size in the range from 30 µm to 150 µm. Support particles which can be used, for example, for polymerization in fixed-bed reactors preferably have mean particle sizes of $\geq 100$ µm, preferably $\geq 300$ µm, more preferably in the range from 1 mm to 10 mm, particularly preferably in the range from 2 mm to 8 mm and even more preferably in the range from 2.5 mm to 5.5 mm.

Preference is given to from 10% by volume to 90% by volume of the support particles, based on the total volume of the particles, having a particle size in the range from $\geq 40$ µm to $\leq 120$ µm, and preference is given to from 30% by volume to 80% by volume of the particles, based on the total volume of the particles, having a particle size in the range from $\geq 30$ µm to $\leq 70$ µm. Particle sizes of the support particles in the range from $\geq 30$ µm to $\leq 70$ µm are preferred.

The support particles preferably have a particle size distribution in which $\geq 90$% by volume, based on the total volume of the particles, of particles have a size in the range from $\geq 16$ µm to $\leq 500$ µm, $\geq 75$% by volume of the particles have a size in the range from $\geq 32$ µm to $\leq 200$ µm and $\geq 30$% by volume of the particles have a size in the range from $\geq 48$ µm to $\leq 150$ µm.

The support particles particularly advantageously have a low fines content after drying. For the purposes of the present invention the fines content of the support particles is the proportion of support particles which have a particle size of less than 25 µm, preferably less than 22 µm, particularly preferably less than 20.2 µm. It is advantageous for less than 5% by volume of the particles after drying, based on the total volume of the particles, to have a particle size in the range from $>0$ µm to $\leq 25$ µm, preferably in the range from $>0$ µm to $\leq 22$ µm, particularly preferably in the range from $>0$ µm to $\leq 20.2$ µm. Preference is given to less than 3% by volume, particularly preferably less than 2% by volume, of the particles, based on the total volume of the particles, having a particle size in the range from $>0$ µm to $\leq 25$ µm, preferably in the range from $>0$ µm to $\leq 22$ µm, particularly preferably in the range from $>0$ µm to $\leq 20.2$ µm. Greater preference is given to less than 5% by volume, preferably less than 2% by volume, of the particles, based on the total volume of the particles, having a particle size in the range from $>0$ µm to $\leq 10$ µm.

Furthermore, preference is given to less than 30% by volume, preferably less than 20% by volume, particularly preferably less than 15% by volume, very particularly preferably less than 10% by volume, of the particles, based on the total volume of the particles, having a particle size in the range from $>0$ µm to $\leq 35$ µm, preferably in the range from $>0$ µm to $\leq 32$ µm.

The support particles prepared by this process have a pore volume which is preferably less than 1.6 ml/g; the support particles more preferably have a pore volume of less than 1.2 ml/g, particularly preferably in the range from 0.8 ml/g to 1.25 ml/g.

The support particles prepared have a pore diameter which is preferably less than 20 nm; the support particles more preferably have a pore volume of less than 15 nm, particularly preferably in the range from 5 nm to 13 nm.

The surface area of the inorganic support can likewise be varied within a wide range by means of the drying method, in particular by the spray drying process. Preference is given to producing particles of the inorganic support, in particular a product from a spray drier, which have a surface area in the range from 100 m$^2$/g to 1000 m$^2$/g, preferably in the range from 150 m$^2$/g to 700 m$^2$/g and particularly preferably in the range from 200 m$^2$/g to 500 m$^2$/g. Supports which can be used for polymerization preferably have a surface area in the range from 200 m$^2$/g to 500 m$^2$/g. The specific surface area of the support particles is based on the surface area of the support particles determined by means of nitrogen adsorption according to the BET technique.

The bulk density of the inorganic supports for catalysts is preferably in the range from 250 g/l to 1200 g/l, with the bulk density being able to vary depending on the water content of the support. The bulk density of water-comprising support particles is preferably in the range from 500 g/l to 1000 g/l, more preferably in the range from 600 g/l to 950 g/l and particularly preferably in the range from 650 g/l to 900 g/l. In the case of supports which comprise no water or have only a very low water content, the bulk density is preferably from 250 g/l to 600 g/l.

The supports which can be prepared according to the invention are particularly useful as supports for olefin polymerization catalysts. These can be any type of catalysts, for example Phillips, Ziegler or single-site catalysts, e.g. metallocene catalysts.

The supports which can be prepared according to the invention are particularly suitable for preparing Phillips catalysts.

For the purposes of the present invention, a Phillips catalyst is a catalyst system comprising a support which can be prepared according to the invention, the element chromium and at least one element selected from among Mg, Ca, Sr, Ba, B, Al, Si, P, Bi, Sc, Ti, V, Mn, Fe, Co, Ni, Cu, Zn, Zr, Nb, Mo, Ru, Rh, Pd, Hf, Ta and W and also, if appropriate, one or more activators. Preference is given to using an element selected from among Mg, Ca, B, Al, P, Ti, V, Zr and Zn in addition to chromium. Particular preference is given to using Ti, Zr or Zn. It should be emphasized that combinations of the abovementioned elements are also possible according to the invention. The elements mentioned can be constituents of the hydrogel or can be applied by subsequent doping of xerogel particles. It should be emphasized that mixtures of compounds of the elements mentioned are also encompassed.

To prepare the Phillips catalysts, the xerogel particles are doped with chromium and, if appropriate, with further elements and are subsequently subjected to calcination. Doping can be carried out by all known methods, with the process described in PCT/EP2005/052681 being preferred for joint application to the support. Here, chromium is applied together with further elements from a homogenous solution to the support.

The calcination of the doped xerogel particles is carried out at temperatures of from 350 to 1050° C., preferably from 400 to 950° C. For the purposes of the present invention, calcination is the thermal activation of the catalyst in an oxidizing atmosphere, unless indicated otherwise, with the chromium compound applied being converted completely or partly into the hexavalent state, i.e. activated, if the chromium is not already present in the hexavalent state. The choice of calcination temperature is determined by the properties of the polymer to be prepared and the activity of the catalyst. The upper limit to it is imposed by the sintering of the support and the lower limit is imposed by the activity of the catalyst becoming too low. Calcination is preferably carried out at a temperature which is at least 20-100° C. below the sintering temperature. The influence of the calcination conditions on the catalyst are known in principle and are described, for example, in Advances in Catalysis, Vol. 33, page 48 ff. Calcination preferably takes place in an oxygen-comprising atmosphere. The intermediate obtained from step b) or c) is preferably activated directly in the fluidized bed by replacement of the inert gas by an oxygen-comprising gas and increasing the temperature to the activation temperature. The intermediate is in this case advantageously heated at the appropriate calcination temperature in a water-free gas stream comprising oxygen in a concentration of more than 10% by volume for from 10 to 1000 minutes, in particular from 150 to 750 minutes, and then cooled to room temperature, resulting in the Phillips catalyst to be used according to the invention. In addition to the oxidative calcination, a preceding or subsequent calcination under inert gas conditions can also be carried out.

Activation can be carried out in a fluidized bed and/or in a fixed bed. Preference is given to carrying out a thermal activation in fluidized-bed reactors.

The catalyst precursor can also be doped with fluoride. Doping with fluoride can be carried out during the preparation of the support, the application of the transition metal compounds or during activation. In a preferred embodiment of the preparation of the supported catalyst, a fluorinating agent is brought into solution together with the desired chromium compound and, if appropriate, further metal compound and the solution is applied to the support in step (a).

All documents cited are expressly incorporated by reference into the present patent application. All percentages in this patent application are by weight based on the total weight of the corresponding mixtures, unless indicated otherwise.

The invention is illustrated below with the aid of examples, without it being restricted thereto.

The following methods of determination were used:

The determination of the surface area, the pore radii and the pore volume of the support particles was carried out by means of nitrogen adsorption according to the BET Technique (S. Brunauer et al., Journal of the American Chemical Society, 60, pp. 209-319, 1939).

All samples were dried beforehand at 150° C. under reduced pressure for 4 hours. Part of the dried beads was subsequently milled and the pore volume was determined.

The determination of the water content in the solvent was carried out by Karl-Fischer titration.

EXAMPLES

The following examples were carried out using silicon oxide-titanium oxide cogel; titanium content of the solid=2.5% by weight, based on titanium.

Example 1

Comparative Example 150 g of water-comprising hydrogel beads having a diameter of 5-25-mm were introduced into a glass cylinder which was provided at the bottom with a coarse glass frit. A constant continuous solvent flow of methanol was fed onto the hydrogel beads from a reservoir located at a higher level. The flow rate was from 150 to 300 ml/hour. The hydrogel beads were always covered with solvent during the entire experiment. This was achieved by means of a siphon-like construction. The water content of the outflowing solvent was checked by Karl-Fischer titration at intervals of one hour.

The alkogel was subsequently dried at 80° C. under reduced pressure and the pore volume and the specific surface area were determined. The results are shown in Table 1.

Example 2

Comparative Example

Example 1 was repeated using isopropanol instead of methanol as solvent. The results are shown in Table 1.

Example 3

Example 1 was repeated with the hydrogel beads being extracted firstly with methanol for 4 hours and subsequently with isopropanol for 4 hours. The results are shown in Table 1.

Example 4

Example 3 was repeated with the hydrogel beads being extracted firstly with methanol for 2 hours and subsequently with isopropanol for 2 hours. The results are shown in Table 1.

TABLE 1

| Extraction time [h] | Water content [% by weight] | | | |
|---|---|---|---|---|
| | Example 1 | Example 2 | Example 3 | Example 4 |
| 1 | 2 | 2.3 | 2.9 | 2.8 |
| 2 | 1.8 | 2.0 | 2.0 | 1.6 |
| 3 | 1.6 | 1.84 | 1.3 | 0.81 |
| 4 | 1.4 | 1.33 | 1.06 | 0.77 |
| 5 | 1.2 | 1.2 | 0.78 | — |
| 6 | 1.1 | 1.1 | 0.72 | — |
| 7 | 1.0 | 1.0 | 0.72 | — |
| 8 | 0.95 | 1 | 0.71 | — |
| Pore volume [ml/g] | 2.03 | 2.11 | 2.22 | 2.18 |
| Spec. surface area [m$^2$/g] | 520 | 517 | 517 | 521 |

Comparison of the results shows that the combined extraction with methanol and isopropanol enabled the pore volume to be increased by 9 or 5% compared to extraction with only methanol or propanol at a constant specific surface area. It is particularly surprising that even when the extraction time is halved, a significantly increased pore volume is retained. Thus, the solvent combination was able to improve both the efficiency of the process and also the quality of the products.

The invention claimed is:

1. A process for preparing an essentially spherical support for olefin polymerization catalysts, which comprises:
   a) preparing a hydrogel comprising a cogel of silicon oxide and at least one further metal oxide,
   b) optionally, washing the hydrogel until the content of alkali metal ions is less than 0.1% by weight, based on the weight of solids,
   c) extracting water from the hydrogel until the water content is less than 5% by weight, based on the total content of liquid, and
   d) drying the hydrogel to form a xerogel,
   wherein step (c) comprises:
   (1) at least one first extraction down to a water content of less than 50% by weight with a first organic solvent followed by
   (2) at least one second extraction with a second organic solvent,
   wherein each of the first and second organic solvents is at least partially miscible with water and is selected from R'OH wherein R' is an organic radical having 1-6 carbon atoms; and
   wherein the second organic solvent has at least one carbon atom more or at least one branch, including the heteroatoms, more than the first organic solvent.

2. The process of claim 1 wherein the first organic solvent is selected from the group consisting of methanol, ethanol, isopropanol and n-propanol and the second organic solvent is selected from the group consisting of isopropanol, n-propanol, n-butanol, isobutanol and t-butanol.

3. The process of claim 1 wherein the at least one first extraction is carried out down to a water content of less than 10% by weight and the at least one second extraction is carried out down to a water content of less than 2% by weight.

4. The process of claim 1 wherein the at least one first extraction is carried out batchwise and the at least one second extraction is carried out continuously.

5. The process of claim 4 wherein from 2 to 5 batchwise extractions and one continuous extraction are carried out.

6. The process of claim 1 wherein the at least one first extraction has a duration of from 2 minutes to 30 minutes.

7. The process of claim 1 wherein the gel is a silicon oxide-titanium oxide cogel.

8. A process for preparing a catalyst for olefin polymerization, which comprises preparing a xerogel according to the process of claim 1 doping the xerogel with a chromium compound, and calcining the doped xerogel at temperatures of from 350 to 1050° C. under oxidating conditions.

* * * * *